United States Patent [19]
Thornton

[11] Patent Number: 5,867,000
[45] Date of Patent: Feb. 2, 1999

[54] CURRENT OVERLOAD PROTECTED WIPER CONTROL ARRANGEMENT

[75] Inventor: Dennis Thornton, Rochester, Mich.

[73] Assignee: ITT Manufacturing Enterprises Inc., Wilmington, Del.

[21] Appl. No.: 852,200

[22] Filed: May 6, 1997

[51] Int. Cl.[6] .................................................. H02P 7/00
[52] U.S. Cl. .................... 318/434; 318/DIG. 2; 361/31
[58] Field of Search .................... 318/443, 444, 318/DIG. 2, 434; 15/250.17, 250.15, 250.12, 250.16; 307/10.1; 361/23, 25, 27, 106

[56] References Cited

U.S. PATENT DOCUMENTS

| | | | |
|---|---|---|---|
| 4,123,694 | 10/1978 | Andrei-Alexandru et al. | 318/443 |
| 4,544,870 | 10/1985 | Kearns et al. | 318/444 |
| 4,866,359 | 9/1989 | Schmid et al. | 318/471 |
| 5,252,897 | 10/1993 | Poeter et al. | 318/443 |
| 5,264,766 | 11/1993 | Tracht et al. | 318/443 |
| 5,691,612 | 11/1997 | Corey et al. | 15/250.15 |
| 5,694,011 | 12/1997 | Corey | 15/250 |

*Primary Examiner*—Jonathan Wysocki
*Attorney, Agent, or Firm*—J. Gordon Lewis; Thomas N. Twomey

[57] ABSTRACT

A wiper control system including a current sensing device is used in conjunction with a park position switch to limit the current drawn by windshield wiper motor whenever the system experiences restrictions in a park mode. The arrangement of components is effective for preventing damage to the motor and motor control system caused by excessive current draw whenever the motor stalls, arcs, or experiences excessive loads. However, the current sensing portion of the circuit is essentially disabled when the motor is in its normal operating mode thus preserving the fail safe operation of the wipers.

8 Claims, 3 Drawing Sheets

FIG 4A
TYPICAL POLYMERIC PTC RESISTANCE VS. TEMPERATURE
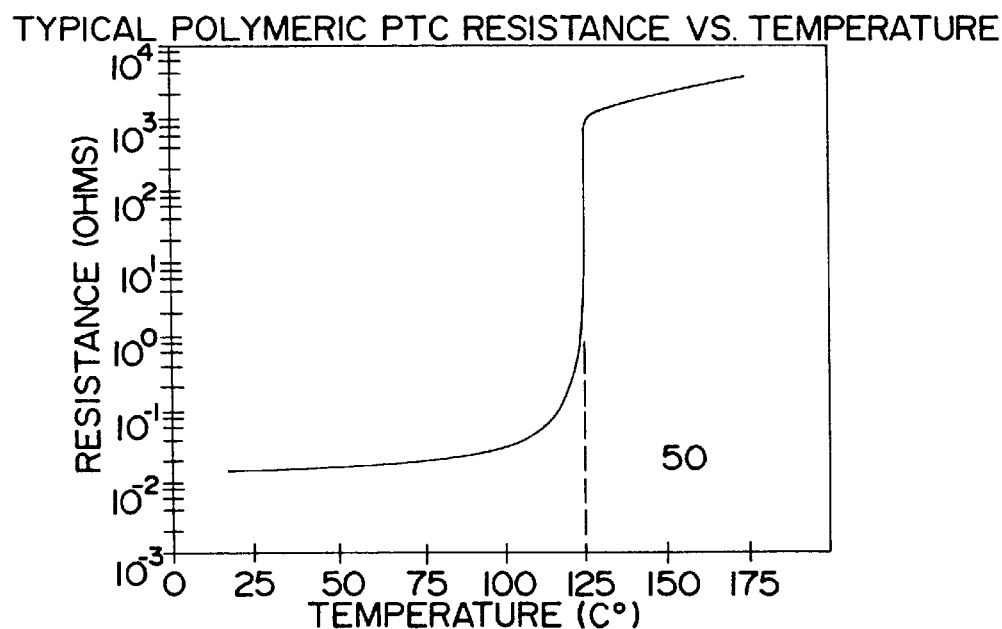
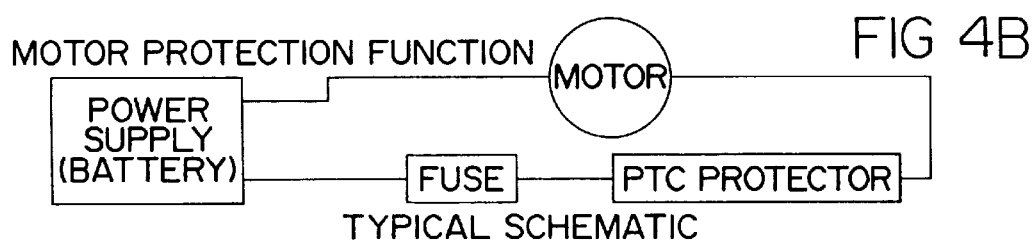
FIG 4B
TYPICAL SCHEMATIC
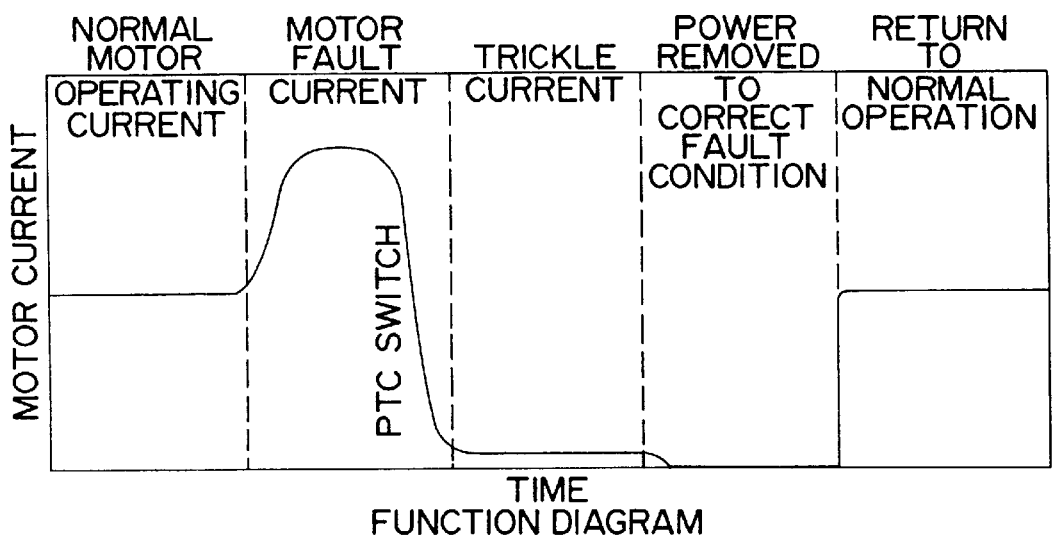
TIME
FUNCTION DIAGRAM
FIG 4C

CURRENT OVERLOAD PROTECTED WIPER CONTROL ARRANGEMENT

TECHNICAL FIELD

This application relates generally to motor controls and more particularly relates to electrical current protection for windshield wiper motors.

BACKGROUND OF THE INVENTION

DC motors have found wide use in automotive applications. It is not uncommon to find DC motors used in the window lift mechanism, seat lift mechanism, sun roof controls, door locks, trunk pull-down assemblies etc. In at least some of these applications, electrical current protection must be provided to the DC motor in order to prevent excessive current draw through the motor or motor control circuit during the motor stall or highly loaded conditions. If some type of current protection is not provided in the DC motor circuit, it is possible that under the stall or highly loaded conditions, the motor will draw sufficient current to destroy either itself, portions of the motor control circuit, or both.

Another common use for DC motors in automotive applications is in windshield wiper assemblies where it is common to employ a DC motor for driving the windshield wipers of the vehicle. Because windshield wiper systems must typically operate in a number of modes (such as park mode, retract mode, high speed, low speed, etc.), the control systems for windshield wiper DC motors tend to be some of the most complex motor control systems found in automotive applications. The systems often utilizes a kinematic linkage between the motor drive shaft and the wiper arm drive system along with electrical sensing circuits located on the wiper drive system to provide feedback information relating to the position of the wiper blades on the windshield. These sensing circuits typically employ switches which can be vulnerable to excessive current conditions especially when an over current condition exist when the wiper blade is restricted in the vicinity of the park position on the windshield. This "over current near park" condition commonly occurs when there is snow or ice buildup along the outlying portion of the windshield wiper stroke. When this snow block condition occurs, the wiper control system tends to cycle the switches responsible for sensing the position of the wiper arm. This cycling causes the switches to move along leading edges of the switch cam which in turn tends to induce arcing between the switch contacts resulting in excessive heat buildup which eventually destroys the switch contacts or melts the plastic which commonly forms the substrate which carries many of the electrical switch components and other drive components found in windshield wiper systems.

Accordingly, it is an object of this invention to set forth a windshield wiper control system consisting of a DC motor and a control circuit wherein the DC motor is prohibited from drawing excessively high currents which would otherwise destroy the DC motor or its control circuitry.

It is also an object of this invention to set forth a over current protection circuit for a windshield wiper system of a vehicle wherein only the park mode of operation is affected by the over current circuit and the remaining wiping modes (high speed, low speed, and intermittent) are not affected by the over current protection circuit.

BRIEF DESCRIPTION OF THE DRAWINGS

FIG. 4A is a characteristic curve for a typical positive temperature coefficient (PTC) device.

FIG. 4B is a non-windshield wiper motor protection circuit using a PTC device.

FIG. 4C is a signal diagram indicating five modes of operation of the circuit of FIG. 4B.

DETAILED DESCRIPTION OF THE PREFERRED EMBODIMENTS

Figure 1:
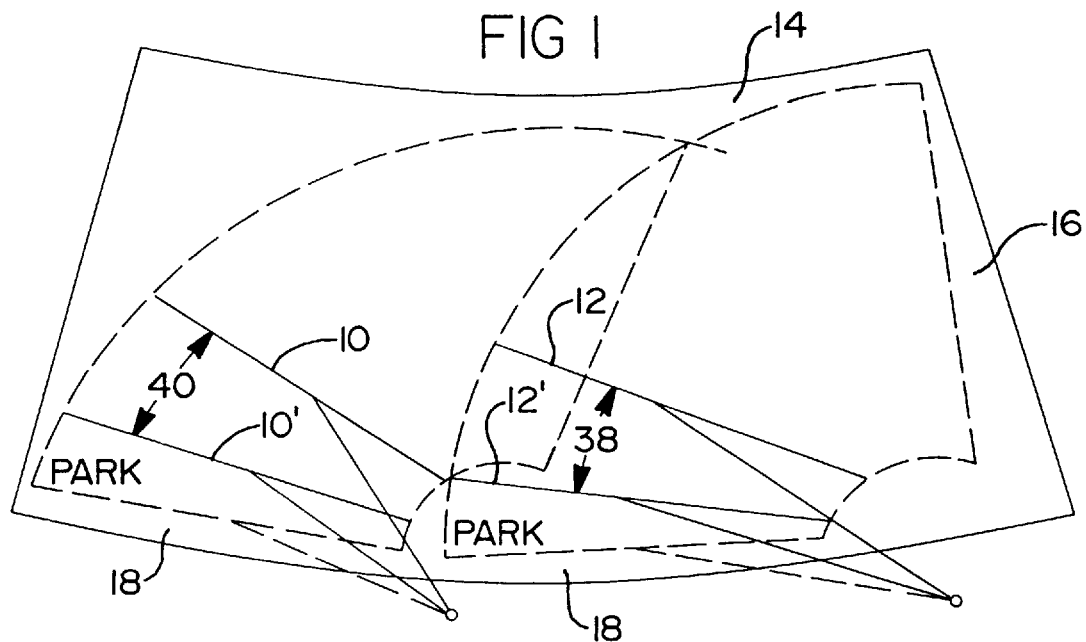
FIG. 1 is a schematic representation of a vehicle windshield and the windshield wiper path traversed thereon.

Now referring to FIG. 1, the control system of the present invention is designed to control the movement of wiper blades 10, 12 as they move across the surface of windshield 14. When wipers 10, 12 move across surface 14 in a snowstorm or the like, it is not uncommon for such systems to encounter a condition of ice or snow buildup at the out-wipe 16 or in-wipe 18 zones of windshield 14. When wipers 10, 12 encounter such a build up in the in-wipe zone 18, blades 10, 12 are restricted from parking which in turn creates the condition whereby the various electrical components of the motor control circuit are exposed to exceptionally high currents which can ultimately destroy components of the motor control circuit.

The motor control circuit of the present invention and its various components will now be examined in detail.

Figure 2:
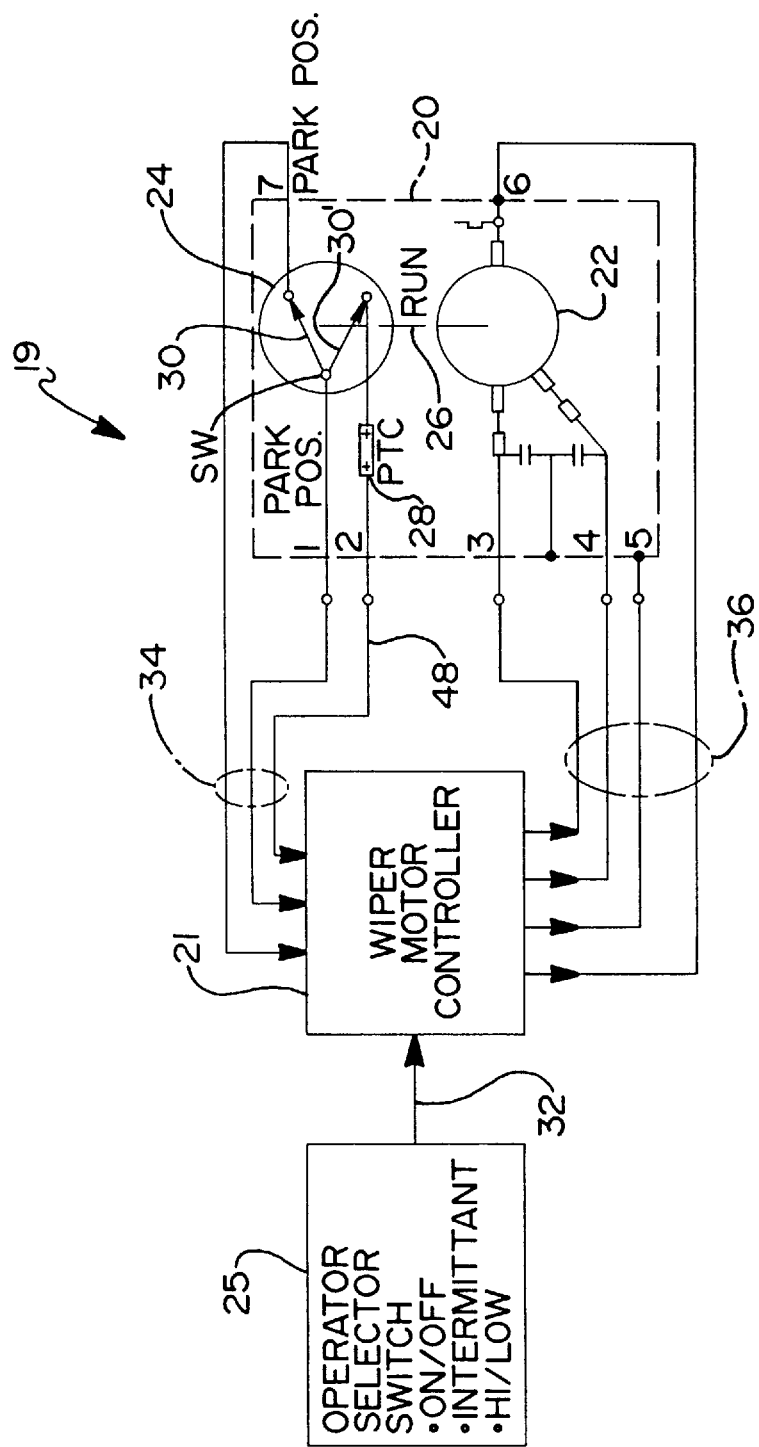
FIG. 2 is a functional/electrical schematic diagram of the control system of the present invention.

Now referring to FIGS. 1 and 2, wiper control system 19 includes motor casing 20, wiper motor controller 21 and operator selector switch 25. Packaged within motor casing 20 are the DC motor's armature and brushes 22 which are mechanically and electrically linked 26 to motor park plate and gear assembly 24. Motor park plate and gear assembly 24 interfaces with one or more switching elements 30, 30' which function to convey electrical signals to wiper motor controller 21 by way of electrical wires 34. These signals are indicative of the position of wipers 10, 12 as they travel across windshield 14. Wiper motor controller 21 accepts various signals transmitted along cable 32 from operator selector switch 25 and uses those signals in conjunction with the feedback signals present on line 34 to control DC motor 22 by way of output control lines 36.

Figure 3:
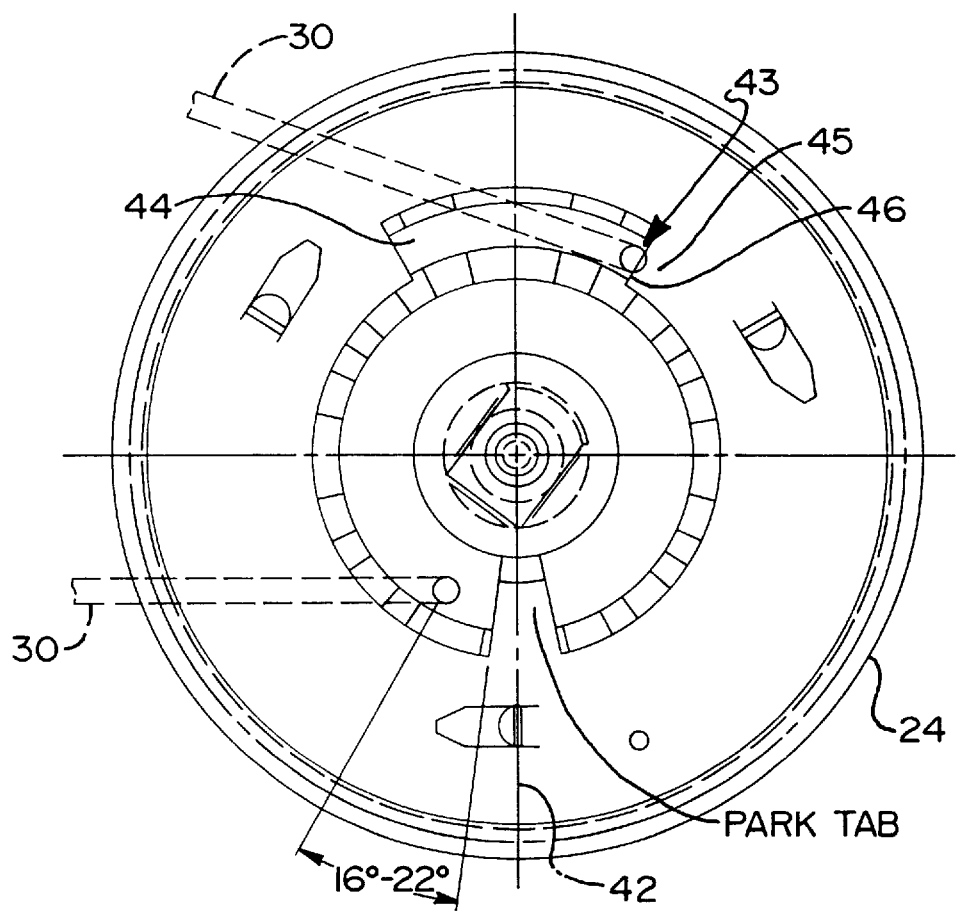
FIG. 3 is a schematic depiction of the park plate of the present invention.

Now referring to FIGS. 1–3, when wiper control system 19 encounters a condition whereby wiper arms 10, 12 are restricted from entering end-wipe zones 18 (this condition is typical when the vehicle is being operated in snow or ice conditions), switch elements 30, 30' (see FIG. 3) will cycle between the pack mode and non-park mode and this cycling will give rise to arcing in a localized area of motor park plate and gear assembly 24 which contacts the particular switch element 30, 30'. These high localized currents will eventually cause electrical failure of switch elements 30, 30' and may ultimately melt the park plate gear assembly 24 which is typically comprised of plastic, nylon or the like. In some designs, this problem is particularly acute when wiper blades 10, 12 are restricted generally between the angular positions greater than 4° from park and less than 10° from park. This angular range is represented by reference numeral 38 for wiper 12 and represented in FIG. 1 by reference numeral 40 for wiper 10.

Motor park plate and gear assembly 24 (FIG. 3) rotates in synchronism with motor 22. Switch elements 30, 30' are stationary within motor casing 20 and ride along tracks defined in a surface of motor park plate and gear assembly 24. During normal operation (i.e. no snow block condition), contacts 30, 30' will be aligned close to the vertical axis 42 when motor 22 is in the park state. In a severe snow block scenario (wherein wipers 10, 12 are restricted within their respectively associated angular ranges 40, 38) switch element 30 would be located on the right-most edge 43 of the COAST TO PARK region 44 of motor park plate and gear assembly 24 (shown in FIG. 3). With switch element 30 within COAST TO PARK region 44 motor 22 is powered down. When switch element 30 is located outside 45 of COAST TO PARK region 44, motor 22 is powered up. Under severe snow restriction (i.e. wiper arms 10, 12 located within their respective angular range 40, 38), switch element 30 oscillates back and forth at the leading edge 46 of COAST TO PARK region 44 making an objectionable "growling" noise which is audible from within the vehicle. This growling noise indicates that the motor is cycling between a powered up mode and a powered down mode. When this occurs, arcing takes place between switch element 30 and leading edge 43 of COAST TO PARK region 44. This arcing eventually results in melting a hole in the motor park plate and gear assembly 24 and destroying switch element 30.

The above scenario occurs under severe snow block scenario where the build up of snow between the vehicle cowl and wipers 10, 12 will not allow system 19 to place wipers 10, 12 in the proper park position.

In order to limit the above-mentioned undesirable growling or prevent the destruction of control system 19 due to excessive current flow, positive temperature coefficient (PTC) device 28 is placed in series with park signal line 48. Placing PTC device 28 in park signal line 48 places it in series with motor 22. Thus, during park mode, whenever motor 22 stalls or electrically arc under a snow block condition, all of the current flowing through motor 22 also flows through PTC device 28. In non-park mode PTC device 28 is not in series with motor 22 and accordingly, cannot influence the function of motor 22. The characteristic curves associated with a particular polymeric PTC device manufactured by Therm-O-Disc, Inc., 1320 S. Main Street, Mansfield, Ohio 44907-0538, telephone (419) 525-8500 is found on FIG. 4A. The graph of FIG. 4A readily demonstrates that the internal resistance of PTC device 28 can change four or more orders of magnitude as a function of the temperature of the PTC device. The PTC device selected should have a very low resistance when operating in the normal current ranges associated with motor 22. However, when motor 22 encounters a stall condition, an arc condition, or excessive loads, its current draw increases dramatically thereby causing the PTC device 28 to heat up due to internal $I^2R$ ohmic losses. Once PTC device heats up (beyond critical point 50) its internal resistance escalates dramatically thereby "choking off" current to motor 22. In order to reset a PTC device current through, the device must be discontinued.

FIG. 4B shows a typical installation of a PTC device when used in conjunction with a motor. FIG. 4C shows various currents associated with the various modes of operation of the circuit of FIG. 4B.

An important aspect of the wiper control system of the present invention is that the PTC device is only present within the motor circuit if the operator has placed the selector switch 25 in the off (or park) position. Thus, when the system is placed in the "on" position, the PTC device is not electrically connected to motor 22 and will not affect the critical operation of wiper motor 22. Thus, the system integrity is preserved (i.e. wipers 10, 12 will still function) even if PTC device 28 should fail inasmuch as it does not conduct motor 22 current during the normal run mode.

It is recognized that those skilled in the art may make various modifications or additions to the preferred embodiments chosen here to illustrate the present invention, without departing from the spirit of the present invention. Accordingly, it is to be understood that the protection sought to be afforded hereby should be deemed to extend to the subject matter claimed and in all equivalents thereof fairly within the scope of this invention.

I claim:

1. A wiper control system, comprising:
   a windshield wiper motor having a movable output shaft, said movable output shaft engaging a windshield wiper of a vehicle;
   a motor controller connected to said motor;
   a switch coupled to said motor to sense a position of said movable output shaft corresponding to a park position associated with said windshield wipers; and
   a current responsive device electrically coupled in series with said switch in a park mode to substantially interrupt current flow to the motor in response to a current flowing through the current responsive device exceeding a prescribed threshold, the motor electrically non-responsive to the current responsive device in a non-park mode.

2. The wiper control system of claim 1, wherein said current responsive device includes a positive temperature coefficient device.

3. The wiper control system of claim 1, wherein said motor includes a rotatable output shaft which drives at least one set of reduction gears and wherein said switch is coupled to at least one reduction gear in said at least one set of reduction gears.

4. The wiper control system of claim 1, wherein said current responsive device comprises a polymeric positive temperature coefficient device.

5. A vehicle windshield wiper control system, comprising:
   a windshield wiper motor having a movable output shaft, said movable output shaft engaging and arranged to selectively manipulate a windshield wiper of a vehicle;
   an electric controller connected to said motor and configured and arranged to place said motor into at least one of a plurality of possible modes of operation, the plurality of possible modes of operation including a park mode;
   position sensing means electrically coupled to said electric controller, wherein said position sensing means is coupled to sense a position of said movable output shaft of said motor; and
   current responsive means coupled in series with said position sensing means in the park mode to substantially interrupt current flow to the motor in response to a current in excess of a prescribed threshold flowing through the current responsive device, the motor electrically non-responsive to the current responsive means in a non-park mode.

6. The vehicle windshield wiper control system of claim 5, wherein said current responsive means includes a positive temperature coefficient device.

7. The vehicle windshield wiper control system of claim 5, wherein said motor output shaft includes at least one set of reduction gears and wherein said position sensing means is coupled to said at least one reduction gear of said at least one set of reduction gears.

8. The vehicle windshield wiper control system of claim 5, wherein said current responsive means comprises a polymeric positive temperature coefficient device.

\* \* \* \* \*